United States Patent [19]

Timsit

[11] Patent Number: 5,100,048
[45] Date of Patent: Mar. 31, 1992

[54] METHOD OF BRAZING ALUMINUM

[75] Inventor: Roland S. Timsit, Kingston, Ontario, Canada

[73] Assignee: Alcan International Limited, Montreal, Canada

[21] Appl. No.: 646,151

[22] Filed: Jan. 25, 1991

[51] Int. Cl.$^5$ .............................................. B23K 35/28
[52] U.S. Cl. ............................... 229/198; 228/263.17; 148/24
[58] Field of Search .................... 148/24, 26; 228/248, 228/198, 207, 263.17, 223

[56] References Cited

U.S. PATENT DOCUMENTS

| | | | |
|---|---|---|---|
| 2,403,110 | 7/1946 | Miller | 148/24 |
| 3,418,144 | 12/1968 | Culp et al. | |
| 3,951,328 | 4/1976 | Wallace et al. | 148/23 |
| 3,971,501 | 7/1976 | Cooke | |
| 3,971,657 | 7/1976 | Daver | 419/2 |
| 4,273,593 | 6/1981 | Mastrangelo | 148/24 |
| 4,579,605 | 4/1986 | Kawase et al. | 148/26 |
| 4,732,311 | 3/1988 | Hasegawa et al. | 228/138 |
| 4,842,185 | 6/1989 | Kudo et al. | |
| 4,901,909 | 2/1990 | George | 148/24 |
| 4,943,000 | 7/1990 | Raynaud et al. | 228/198 |

FOREIGN PATENT DOCUMENTS 696606 10/1964 Canada .................................. 148/24
56-160869 12/1981 Japan .................................. 228/248

OTHER PUBLICATIONS

Metals Handbook 9th ed., vol. 6 "Brazing of Aluminum Alloys", pp. 1022-1027, 1983.

*Primary Examiner*—Richard K. Seidel
*Assistant Examiner*—Jeanne M. Elpel
*Attorney, Agent, or Firm*—Cooper & Dunham

[57] ABSTRACT

A novel method is described for joining aluminum surfaces by brazing. The method comprises (a) applying as a coating to at least one of the aluminum surfaces to be joined a mixture of a metal and a brazing flux, the metal of the mixture being adapted to form a brazable eutectic with the aluminum, (b) heating the surfaces and the coating in juxtaposed relation to a temperature above the brazing alloy melting point to thereby dissolve oxide film on the surface to be joined, cause the metal of the coating to dissolve into the oxide-free aluminum surface and form therewith a brazing alloy layer and form a brazed assembly and (c) cooling the brazed assembly to form a solidified joint between the surfaces. This has the advantage of providing for the joining of aluminum surfaces by brazing without the prior formation of a brazing alloy cladding on the surfaces to be brazed.

8 Claims, No Drawings

METHOD OF BRAZING ALUMINUM

BACKGROUND OF THE INVENTION

This invention relates to a method of joining aluminum surfaces by brazing.

It is known to join aluminum components by disposing an aluminum brazing alloy between or adjacent the component surfaces to be joined, and heating the brazing alloy and the joining surfaces in appropriately assembled fashion to a temperature (brazing temperature) at which the brazing alloy melts while the components remain unmelted. Upon subsequent cooling, the brazing alloy forms a fillet or joint that bonds the joining surfaces of the components. For assured selective melting of only the brazing alloy in the heating step, it is commonly preferred that the melting point of the brazing alloy be at least 30° to 40° C. lower than that of the metal of the components. An example of a suitable aluminum brazing alloy is an Al-Si eutectic composition, which melts at about 577° C.

It is common practice to pre-clad at least one of the surfaces being joined with a layer of aluminum brazing alloy. Such pre-clad articles, generally known as brazing sheet, are relatively costly, and in many instances it is preferred to provide the brazing alloy in some form other than cladding. One known alternative is to apply the brazing alloy to or adjacent to one or both joining surfaces in powdered or particulate form carried in a suitable liquid or paste-like vehicle.

(Cooke) In U.S. Pat. No. 3,971,501 there is described a method of joining aluminum surfaces with an aluminum brazing alloy in which a mixture of the aluminum brazing alloy in powdered form and a powdered flux is coated on the surfaces to be joined. The coating is then dried and the surfaces are then heated to a brazing temperature whereby the brazing is completed. This procedure, like other known systems, utilizes a brazing alloy.

Although fluxless brazing procedures have been devised, their use is limited because of economic and other considerations arising from the special conditions and equipment required for successful practice of such procedures. It is, therefore, generally necessary to employ a flux in brazing aluminum, to remove the oxide ordinarily present on exposed metal surfaces at the location of the joint, as well as to promote flow of molten brazing alloy during the heating step. The material used as a flux must be capable of acting as a flux to dissolve and/or otherwise remove the metal oxides at the brazing temperatures while remaining essentially inert with respect to the aluminum at such temperatures. Since fluxes are usually reactive only when at least partially molten, fluxes for aluminum brazing should as a practical matter be partly or wholly molten at brazing temperatures, e.g. at temperatures not substantially higher and preferably lower than 577° C.

Flux materials heretofore commercially employed in brazing aluminum have commonly been mixtures of predominantly chloride salts, with minor additives of fluoride in some cases. A recent highly successful flux for brazing aluminum is one sold under the trade mark NOCOLOK®, which is essentially a potassium fluoaluminate.

It is the object of the present invention to provide an improved method of joining aluminum surfaces by brazing without the prior formation of a brazing-alloy cladding on the surfaces to be brazed.

SUMMARY OF THE INVENTION

According to the present invention, an improved method is provided for joining aluminum surfaces with a brazing alloy having a melting point lower than that of the metal of the surfaces to be joined. The method comprises (a) applying as a coating to at least one of the aluminum surfaces to be joined a mixture of a metal and a brazing flux, the metal of the mixture being adapted to form a brazable eutectic with the aluminum, (b) heating the surfaces and the coating in juxtaposed relation to a temperature above the melting point of both the flux and the brazing alloy to thereby dissolve or remove the oxide film on the surface to be joined, cause the metal of the coating to dissolve in the oxide free aluminum surface and form therewith a brazing alloy layer which melts and flows to the interface between the two workpieces to be joined to form the joint and thereby braze the assembly, the molten flux reducing the surface tension of the molten brazing alloy and promoting its flow into the interface, and (c) cooling the brazed assembly to form a solidified joint between the surfaces.

The coating mixture may be applied either as a dry powder or as a slurry, preferably in a volatile liquid carrier, which may be water based or based on an organic compound such as alcohol.

The preferred metal component of the coating mixture is silicon but other metals such as zinc may be used. In this specification and in the accompanying claims, the word metal refers to the elemental form of a metal, as commercially available in unalloyed form, which may include small concentrations of impurities which do not affect its characteristics. The main requirement is that there be present in the coating mixture a metal component which at brazing temperatures is capable of dissolving in the aluminum and form in situ with the aluminum a layer of brazing alloy.

The flux component of the coating mixture may be any material capable of removing the oxide layer and which melts below 600° C., but the potassium fluoaluminate product available under the trade mark NOCOLOK® is particularly desirable. The metal component and flux material are typically present in the mixture in a ratio (weight/weight) of metal component to flux in the range from 0.1-3:1.

The metal component of the coating mixture is preferably in the form of fine particles, e.g. ranging in dimensions from about 1-50 microns, but larger particles up to 500 microns may be used. The coating mixture is preferably applied to the interface of interest in a coverage ranging preferably from about 5-30 g/m$^2$, but coverages up to 100 g/m$^2$ may be used.

When the metal component of the coating mixture is silicon particles, the joining procedure of the invention is preferably carried out at a temperature in the range of 500°-650° C. The quality of the braze, i.e. completeness of the braze, dimensions of the fillet, etc., depends upon the relative Si/flux content in the brazing mixture, and on the surface coverage by that mixture, and the length of time held at the brazing temperature. It has been found that the best filleting may be achieved at a surface coverage of about 20 to 30 g m$^{-2}$ with a silicon concentration of about 30% by weight.

The brazing occurs through the complimentary actions of the flux material and the silicon. For instance, at 600.C the flux is molten and dissolves or removes the native oxide film on the aluminum surfaces being joined, exposing fresh aluminum to the fine silicon powder.

Because of the high solubility of silicon in aluminum at this temperature, the silicon dissolves rapidly into the exposed aluminum surface, forming a surface layer of Al/Si alloy with a composition believed to be close to the Si/Al eutectic of 11% Si/89% Al in each of the aluminum components. Since the melting point of this eutectic is only 577° C., the silicon-containing aluminum surfaces melt and flow at 600° C. to fill the joint interface of interest. The molten flux reduces the surface tension of the molten Si/Al eutectic alloy, and draws the molten alloy into the joint interface tereby improving the quality of the brazed joint. It should be noted that the use of too large a quantity of silicon with the flux powder may preclude the generation of an aluminum surface alloy-layer of low melting point and high fluidity, and hence may preclude the formation of a satisfactory brazing fillet in the joint. Because the formation of the Al/Si eutectic alloy depends on diffusion of silicon into aluminum, the brazing process requires at temperature above 577° C. a time interval sufficiently long for Si-diffusion and for the ensuing alloy-forming and fillet forming processes to occur. This time interval typically ranges from about 2 to 5 minutes, depending upon the dimensions of the fillet.

It has also been found that the quality of brazing fillets in joints fabricated from aluminum components containing alloying elements such as magnesium, manganese, copper, etc., along with aluminum may be enhanced through the addition of traces of powders of these or other elements or alloys of these and of other elements, e.g. selenium, in the Si/NOCOLOK ® mixture. The corrosion resistance of the aluminum joint brazed using the above mixture may also be significantly enhanced by the inclusion of a galvanically sacrificial material such as zinc powder, or the like, in the brazing mixture. The quantity of this sacrificial material must be selected to satisfy the requirement of generating corrosion protection without degrading the overall quality of the braze.

DESCRIPTION OF THE PREFERRED EMBODIMENTS

By way of further illustration of the invention reference may be had to the following specific examples:

EXAMPLE 1

Two coupons of AA1100 alloy were used. These coupons were 1 inch wide, 1½ inches long, and 0.050 inch thick.

A flux-silicon coating mixture was prepared by mixing together NOCOLOK ® brazing flux and silicon metal powder having a typical particle size of about 30 microns. The flux and silicon were mixed in different proportions as indicated in the Table I below.

The flux-silicon coating mixture was slurried in isopropyl alcohol. It was applied to the surface of the coupons by dipping them into the slurry, withdrawing, and drying the coupons at 150° C. for five minutes. The two pieces were then assembled to form a "T", and heated in a brazing furnace in an atmosphere of nitrogen to a temperature of 600° C. The total time for the brazing operation was 12 minutes, with about a 3 minute interval at the maximum temperature of 560°–605° C.

The quality of the braze, in terms of the size and quality of the braze fillet, was noted. The results are shown in the following Table 1:

TABLE 1

| Carrier | Si/Flux (wt/wt) Ratio | Weight Applied Total g/m² | Flux g/m² | Si g/m² | Quality of Braze |
|---|---|---|---|---|---|
| None | 0.56 | 15.6 | 10 | 5.6 | Thin fillet formed |
| None | 1.23 | 21 | 9.4 | 11.6 | Excellent fillet |
| Isopropyl Alcohol | 0.5 | 10 | 6.7 | 3.3 | Partial Brazing |
| Isopropyl Alcohol | 0.25 | 9.6 | 7.7 | 1.9 | No Braze |

These test results indicated that a loading of 3.3 g/m² of Si powder was insufficient to effect brazing, but a loading of 9.4 g/m² was sufficient to give an excellent braze.

EXAMPLE 2

The use of water and isopropyl alcohol vehicles for the slurry were compared. It is known that isopropyl alcohol wets the surface of the aluminum without pre-cleaning being required because it penetrates through the oil and grease layer on the surface of the aluminum sheet. However, in industrial practice only the water vehicle system may be used. A test was therefore carried out to determine if the use of a water carrier can deposit sufficient flux and Si on the sheet surface to effect satisfactory brazing.

The flux/Si mixture was made up in various ratios of Si to flux, and this was made into varying concentrations of slurry as shown in TABLE 2.

The test specimen used in these tests was a small section of a typical aluminum heat exchanger, made up of two sheets of AA1100 sheet sandwiching a corrugated fin made of AA3003 alloy. None of this material was clad with the usual Al-11% Si brazing alloy. In the test, the alcohol carrier slurry was applied directly to the metal surface. The water carrier slurry was applied to the cleaned metal surface. The cleaning was done by immersing the test specimen in a 5% wt/wt solution of sodium hydroxide for 5 to 15 seconds, to ensure that there was good wetting of the surface by the water carrier slurry.

The slurry of flux/Si mixture was applied by immersing the test specimen in the slurry, withdrawing, and evaporating the carrier by drying the specimen at 150.C for five minutes. The increase in weight of the specimen was measured, and from the increase in weight the amount of flux and silicon metal on the surface was calculated. The results are shown in TABLE 2.

These results indicate that adequate weights of Si metal and flux could be deposited from the water carrier slurry.

TABLE 2

| Slurry Conc. % wt Solid | Slurry Type | Dry Slurry Coating Weight | | | | | |
|---|---|---|---|---|---|---|---|
| | | Alcohol Carrier Si/Flux wt/wt Ratio | | | H₂O Carrier Si/Flux wt/wt Ratio | | |
| | | 1:1 | 1:2 | 1:3 | 1:2.8 | 1:3.3 | 1:4 |
| 20 | Si (g/m²) | 2.5 | 1.7 | 1.2 | — | — | — |
| | Flux (g/m²) | 2.5 | 3.4 | 3.4 | — | — | — |
| | Total (g/m²) | 5.0 | 5.1 | 4.6 | — | — | — |
| 30 | Si (g/m²) | 3.9 | 2.7 | 2.1 | — | — | — |
| | Flux (g/m²) | 3.9 | 5.4 | 6.3 | — | — | — |
| | Total (g/m²) | 7.8 | 8.1 | 8.4 | — | — | — |
| 40 | Si (g/m²) | 6.4 | 4.6 | 4.5 | 7.0 | 6.5 | 4.3 |
| | Flux (g/m²) | 6.4 | 9.3 | 13.4 | 19.5 | 21.5 | 17.1 |

TABLE 2-continued

| Slurry Conc. % wt Solid | Slurry Type | Dry Slurry Coating Weight | | | | | |
|---|---|---|---|---|---|---|---|
| | | Alcohol Carrier Si/Flux wt/wt Ratio | | | H$_2$O Carrier Si/Flux wt/wt Ratio | | |
| | | 1:1 | 1:2 | 1:3 | 1:2.8 | 1:3.3 | 1:4 |
| | Total (g/m$^2$) | 12.8 | 13.9 | 17.9 | 26.5 | 28.0 | 21.4 |

EXAMPLE 3

The specimens of Example 2 were used. A mixture of flux and silicon was applied from an isopropyl alcohol carrier slurry, using three different slurry concentrations at 20, 30 and 40% by wt. solids, to give different weights of coatings of Si and flux, as indicated in TABLE 3.

The specimen was dipped into the slurry, and the carrier was removed by drying at 150° C. for five minutes. The specimens were then brazed at three different final temperatures, 585°, 590°, and 600° C., in an atmosphere of nitrogen, following the same procedure given in Example 1.

TABLE 3

Si/Flux Alcohol Braze System; Visual Fillet Size Assessment

| Slurry Concentration | | 20% wt solid | | | 30% wt solids | | | 40% wt solids | | |
|---|---|---|---|---|---|---|---|---|---|---|
| Temp °C. | Si:Flux Ratio | 1:1 | 1:2 | 1:3 | 1:1 | 1:2 | 1:3 | 1:1 | 1:2 | 1:3 |
| 600 | Si (g/m$^2$) | 2.6 | 1.9 | 1.3 | 3.9 | 3.1 | 2.2 | 6.5 | 4.7 | 4.5 |
| | Flux (g/m$^2$) | 2.6 | 3.8 | 3.9 | 3.9 | 6.2 | 6.6 | 6.5 | 9.4 | 13.5 |
| | Fillet Quality | A | A | B | A | B | C* | A | A | B |
| 590 | Si (g/m$^2$) | 2.4 | 1.6 | .9 | 3.9 | 2.3 | 2.1 | 6.6 | 4.1 | 4.5 |
| | Flux (g/m$^2$) | 2.4 | 3.1 | 2.5 | 3.9 | 4.6 | 6.3 | 6.6 | 8.3 | 13.3 |
| | Fillet Quality | B | C | D | A | D | D | A | A | A |
| 585 | Si (g/m$^2$) | 2.4 | 1.6 | 1.3 | 4.0 | 2.7 | 2.0 | 6.0 | 5.1 | 4.4 |
| | Flux (g/m$^2$) | 2.4 | 3.3 | 3.9 | 4.0 | 5.4 | 6.0 | 6.0 | 10.0 | 13.3 |
| | Fillet Quality | D | D | D | A | C | C | C | B | A |

Fillet Description
A - Continuous/large
B - Continuous/moderate
C - Continuous/small
D - Discontinuous/very small
* - Anomaly The above results indicate the range of flux and metal that give satisfactory results:

At 600° C. brazing temperature, satisfactory results are obtained with as little as 1.3 g/m$^2$ of Si, and a Si:Flux ratio of 1:3. For Si:Flux ratios larger than 1:3, satisfactory fillets are obtained with 2 to 6.5 g/m$^2$ of Si.

At 590° C. brazing temperature, satisfactory results are obtained with as little as 2.4 g/m$^2$ of Si, provided that Si:Flux ratio is 1:1.

At 585° C. brazing temperature, satisfactory results are obtained with approximately 4.0 g/m$^2$ of Si, and a Si:Flux ratio of 1:1.

Thus, at higher brazing temperatures, smaller concentrations of Si are required to obtain satisfactory brazing.

EXAMPLE 4

The specimens were prepared according to the procedure of Example 2. The mixture of silicon and NOCOLOK ® flux was applied from a water carrier slurry; the solids concentration was 40% by wt.

The brazing was carried out at 600° C., and the quality of the braze was visually assessed, the results are given in Table 4.

TABLE 4

Si/Flux Alcohol Braze System; Visual Fillet Size Assessment

| Slurry Concentration | | 40% wt solids | | |
|---|---|---|---|---|
| Temp. °C. | Si:Flux Ratio | 1:2.8 | 1:3.3 | 1:4 |
| 600 | Si (g/m$^2$) | 7.0 | 6.5 | 4.3 |
| | Flux (g/m$^2$) | 19.5 | 21.5 | 17.1 |
| | Fillet Quality | A | B | C |

Fillet Description
A - Continuous/large
B - Continuous/moderate
C - Continuous/small These results indicate that a loading of 7.0 g/m$^2$ of Si is required to obtain consistently good braze fillet, and that 4.30 g/m$^2$ is insufficient when the Si/Flux ratio is smaller than 1:3.3.

EXAMPLE 5

This is an example of the improvement in corrosion resistance obtained by adding zinc metal powder to a NOCOLOK ®/Si powder mixture.

The flux metal mixture comprised:
1 part Zn powder, (99.9% pure, about 8 micron size)
1 part Si powder, (99.1% pure, about 44 micron size)
4 parts NOCOLOK ® flux This was slurried in sufficient water to give 40% solids.

The flux/metal mixture was applied to 1"×1½" coupons of AA1100 and AA3003 previously cleaned by immersion in 5% by wt solution of sodium hydroxide, by dipping them into the slurry, and drying, and brazing. The resulting loading was 4.3 g/m$^2$ of Si, 4.5 g/m$^2$ of Zn and 17.2 g/m$^2$ of NOCOLOK ® flux.

The coupons were assembled into a "T" joint and brazed by heating to 600° C. under a nitrogen atmosphere.

The coupons were cut up, and a cross section of the braze was examined by a scanning electron microscope. This indicated that there was diffusion of the Zn into the aluminum alloy to a depth of at least 50 microns, and that almost all of the Si had reacted with the Al to make an Al-11% Si eutectic alloy.

Subsequently, the coupons were subjected to a corrosion test and compared with those made by the usual NOCOLOK ® brazing process, without either Si or Zn added to the flux. The results of the corrosion test showed that the addition of Si to the flux did not adversely affect the corrosion resistance of the coupons.

It is to be understood that the invention is not limited to the features and embodiments hereinabove specifically set forth but may be carried out in other ways without departure from its spirit.

I claim:

1. A method of joining aluminum surfaces with a brazing alloy having a melting point lower than that of the metal of the surfaces to be joined, comprising,
    (a) applying as a coating to at least one of the aluminum surfaces to be joined a mixture of (a) elemental silicon and (b) a flux material capable of removing the oxide layer and which melts below 600° C., said silicon being adapted to form a brazable eutectic with aluminum,
    (b) heating said surfaces and said coating, in juxtaposed relation, to a temperature above the melting point of both the flux material to remove the oxide film and the brazable eutectic with aluminum to thereby remove oxide film on said surfaces to be joined, cause said silicon to dissolve into the oxide-free aluminum surface and form therewith a brazing alloy layer and form a brazed assembly, and
(d) cooling the brazed assembly to form a solidified joint between the surfaces.

2. A method according to claim 1 wherein the mixture of silicon and brazing flux is applied as a dry powder.

3. A method according to claim 1 wherein the mixture of silicon and brazing flux is applied as a slurry.

4. A method according to claim 3 wherein the slurry includes a volatile liquid carrier.

5. A method according to claim 1 wherein the brazing flux is a potassium fluoaluminate flux.

6. A method according to claim 5 wherein the coating mixture contains at least one additional metal selected from Zn and Se.

7. A method according to claim 1 wherein the ratio wt/wt of silicon to flux in the coating is 0.1-3:1.

8. A method according to claim 1 wherein the coated surfaces being joined are heated to a temperature in the range of 500°-650° C.

* * * * *